United States Patent [19]

Ladin

[11] Patent Number: 6,033,228

[45] Date of Patent: Mar. 7, 2000

[54] SWIMMER'S TRAINING METHOD WITH A VISUAL DISPLAY

[76] Inventor: Eli M. Ladin, 1608 Morton Ave., Ann Arbor, Mich. 48104

[21] Appl. No.: 08/897,219

[22] Filed: Jul. 14, 1997

Related U.S. Application Data

[62] Division of application No. 08/664,568, Jun. 17, 1996, Pat. No. 5,697,792.

[51] Int. Cl.⁷ .................................................. A63B 69/12
[52] U.S. Cl. .............................. 434/254; 434/247; 482/3; 368/10; 368/107
[58] Field of Search .................................... 434/247, 254; 482/1–9, 900–902; 368/10, 2, 69, 101–113; 340/323 R

[56] References Cited

U.S. PATENT DOCUMENTS

| | | | |
|---|---|---|---|
| 3,952,352 | 4/1976 | Wan et al. ................................. | 441/64 |
| 4,309,599 | 1/1982 | Myers ........................................ | 377/5 |
| 4,776,045 | 10/1988 | Mysliwiec et al. ...................... | 2/426 |
| 5,391,080 | 2/1995 | Bernacki et al. ......................... | 482/6 |
| 5,446,506 | 8/1995 | Dawkins ................................. | 360/74.6 |
| 5,585,871 | 12/1996 | Linden .................................... | 351/158 |
| 5,685,722 | 11/1997 | Taba ........................................ | 434/254 |

Primary Examiner—Glenn E. Richman
Attorney, Agent, or Firm—Alex Rhodes

[57] ABSTRACT

A training method with a visual display for a swimmer. A compact apparatus is mounted on a mid-portion of a swimmer for generating a fluctuating signal which varies in frequency according to the speed of the swimmer. The swimmer changes his form and/or movement to vary the frequency of the signal. The signal is processed to produce a fluctuating visual signal which is communicated by a visual display to the swimmer to immediately inform him whether the change in form or movement has increased or decreased his speed.

15 Claims, 7 Drawing Sheets

SWIMMER'S TRAINING METHOD WITH A VISUAL DISPLAY

This application is a division of application Ser. No. 08/664,568, filed Jun. 17, 1996. now Pat. No. 5,697,792.

FIELD OF THE INVENTION

This invention relates to training methods and more particularly to a training methods for a swimmer.

BACKGROUND OF THE INVENTION

Lap counters and timing devices are widely used for training swimmers. The devices are unable to detect the effects of small changes in performance. Consequently, the effects of small changes in a swimmer's technique are overlooked. In competitive swimming, winners and losers are often decided by as little as a small fraction of an arm length. Small changes in a swimmer's performance can result in either a gold medal or a last place finish.

In my pending U.S. application Ser. No. 08/629,026, a training apparatus is disclosed which instantly informs a swimmer of the effects of changes in his form and/or movements on his performance. Not only is he able to instantly detect small changes in his performance, but also to improve his performance more quickly, because he can evaluate multiple changes in his technique during a single lap of a pool.

In the referenced pending application, a module is mounted on a swimmer and generates audio signals that vary in frequency with the swimmer's speed. The audio signals are transmitted to an earphone worn by the swimmer to permit him to evaluate whether his performance has improved.

SUMMARY OF THE INVENTION

This invention is a development of the referenced U.S. Pat. application Ser. No. 08/629,026 which is incorporated herein by reference. A primary object of this invention is to employ visual signals in lieu of audible signals for improving a swimmer's performance.

In keeping with the above objectives, a substantially "service free" module is attached to the waist of a swimmer which transmits visual signals to -the swimmer that enable the swimmer to evaluate small changes in his form and/or movements.

In a first form of the module, an impeller is mounted in a battery powered module worn by a swimmer and is driven by a forward motion of the swimmer. The impeller revolves about an axis which is normal to the path of the swimmer and has a pair of permanent magnets mounted at the ends of opposite vanes of the impeller. The magnetic fields of the revolving magnets act on a magnetic field type transducer to produce a pulsating voltage signal which varies directly in frequency with the speed of the swimmer.

The output of the magnetic field sensor is electronically processed and transmitted to a flashing visual display worn by the swimmer. Changes in the frequency of the flashing visual display inform the swimmer of whether changes in his form and/or movement have improved or otherwise altered his performance. A sensitivity control is provided to compensate for differences between beginning swimmers and accomplished swimmers.

At a high level of the sensitivity control, changes in the frequency of the visual display are greater with small changes in the swimmer's speed. A water actuated switch is provided to activate the module when it is immersed in water and to de-activate the module when it is removed from the water. The water actuated switch extends the life of the battery by preventing the module from inadvertently being left operational when it is removed from the water.

In a second form of the module, a pulsating voltage is induced in a coil of wire by revolving magnets. The voltage which is induced in the coil is processed and transmitted to the visual display worn by the swimmer. A battery is not a necessity in the second aspect and is optional.

Several types and patterns of visual displays are disclosed which apply to either aspect of the disclosed swimmer's training apparatus In one of the embodiments, an audio system is incorporated as an option for evaluating changes in a swimmer's performance.

Further objects, benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

DETAILED DESCRIPTION OF THE PREFERRED EMBODIMENT

Referring now to the drawings wherein like numerals designate like and corresponding parts throughout the several views, in FIGS. 1–12, inclusive, a swimmer's training apparatus is illustrated which embodies the present invention. A distinguishing feature of the invention is that a visual display 46 informs a swimmer whether changes in his technique have improved or reduced his performance. The visual display 46 may be in various patterns and forms, hereinafter sometimes referred to as "the information", it not being my intention to limit the scope of my invention to a particular pattern or form.

The invention can be generally understood by referring to FIGS. 1 through 15, inclusive, taken in conjunction with the following description. A generally rectangular compact module 31 is attached to the underside of a swimmer 32 with a belt 33 that surrounds the swimmer's waist. The position of the module 31 is preferable because it provides a relatively unobstructed path for water to enter an aperture 34 in a lower housing 35 of the module 31 when the swimmer 32 advances in the water. Moreover, it places the module 31 at a distance from turbulence due to the swinging arms and feet of the swimmer 32.

When the swimmer 32 advances in the water, water enters the aperture 34 in the direction of arrow "A" and rotates an impeller 36 about an axis which is perpendicular to the path of the swimmer 32. At the entrance to the module 31, ahead of the impeller 36, are a series of straightening vanes 37 for reducing turbulence which may be present in the water entering the module 31.

A pair of permanent magnets 40 and 41 are mounted on end portions of opposite blades 39 of the impeller 36 and revolve with the impeller 36 when the swimmer 32 moves through the water. One of the magnets 40 has an outward facing north pole and the other magnet 41 has an outward facing south pole. The revolving magnets 40 and 41 produce a pair of revolving magnetic fields which act on a sensor 42, such as a Hall effect or magneto-resistive magnetic field transducer. The sensor 42 is mounted in an upper housing 43. The effect of the magnets 40 and 41 on the sensor 42 is a pulsating output signal whose frequency varies directly with the speed of the swimmer 32. As will be later understood in the present invention, a coil of wire 44 may also be used in lieu of a magnetic field sensor, to produce a pulsating signal.

By way of example of a magnetic field sensor, one type of Hall sensor 42, commonly referred to as a Hall switch, has two output voltage states, namely, an "ON" ("high") state and an "OFF" ("low") state. Each time the outward facing north pole passes the sensor 42, the output goes low and remains low until the outward facing south pole passes the sensor 42, causing the output to go high. With a single pair of magnets 40 and 41, the sensor 42 produces one pulse during each rotation of the impeller 36. The number of pulses per each rotation can be increased by increasing the number of magnets on the impeller and/or providing multiple sensors.

Since the rotational speed of the impeller 36 varies directly with the speed of the swimmer 32, changes in the frequency of the output signal of the sensor 42 are indicative of changes in the swimmer's speed. It will be understood from the referenced pending application Ser. No. 08/629,026, that a single output pulse can also be obtained with single ring and bar permanent magnets.

The output of the sensor 42 is fed to a signal processing unit 45 wherein the signal is processed prior to being transmitted to a visual display 46 worn by the swimmer 32. After processing, the signal is transmitted to the visual display 46 worn by the swimmer 32. The sensor 42 and signal processing unit 45 are comprised of linear and digital circuits and components which are known in the art.

Figure 2:
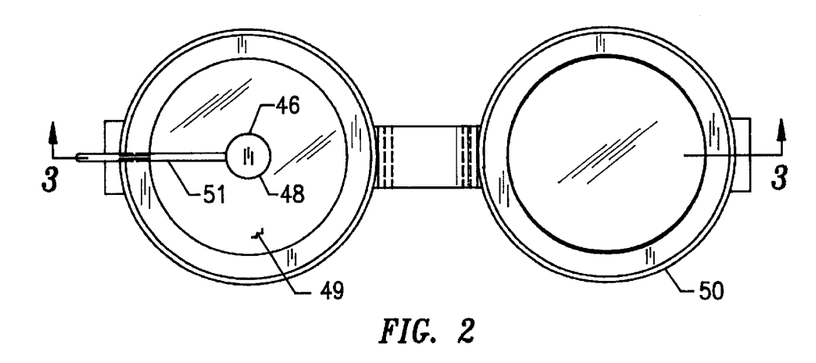
FIG. 2 is a front view of a pair of swimmer's goggles worn by the swimmer.
Figure 3:
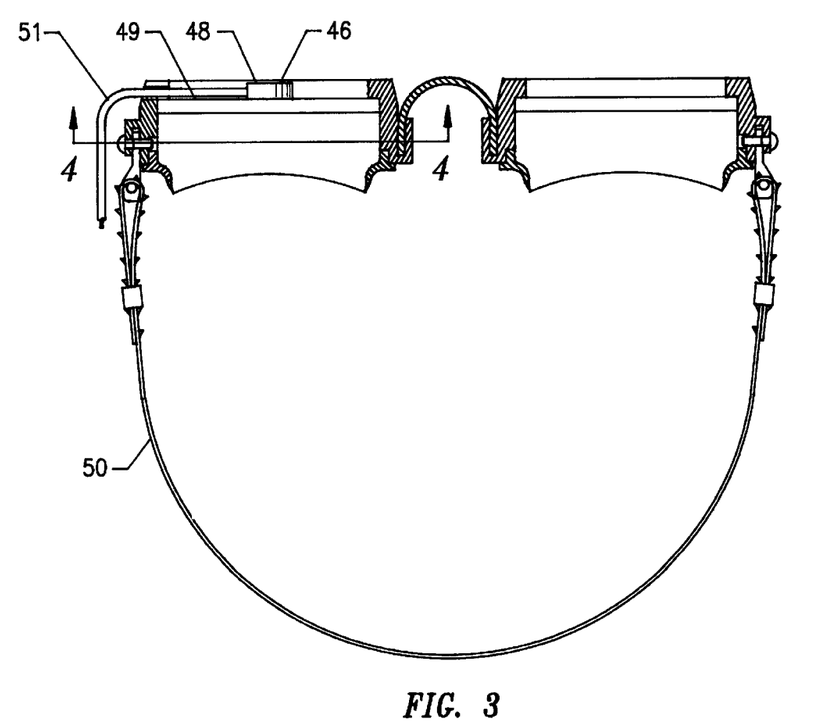
FIG. 3 is a cross-sectional view taken on the line 3—3 in FIG. 2.
Figures 4, 7, 8:
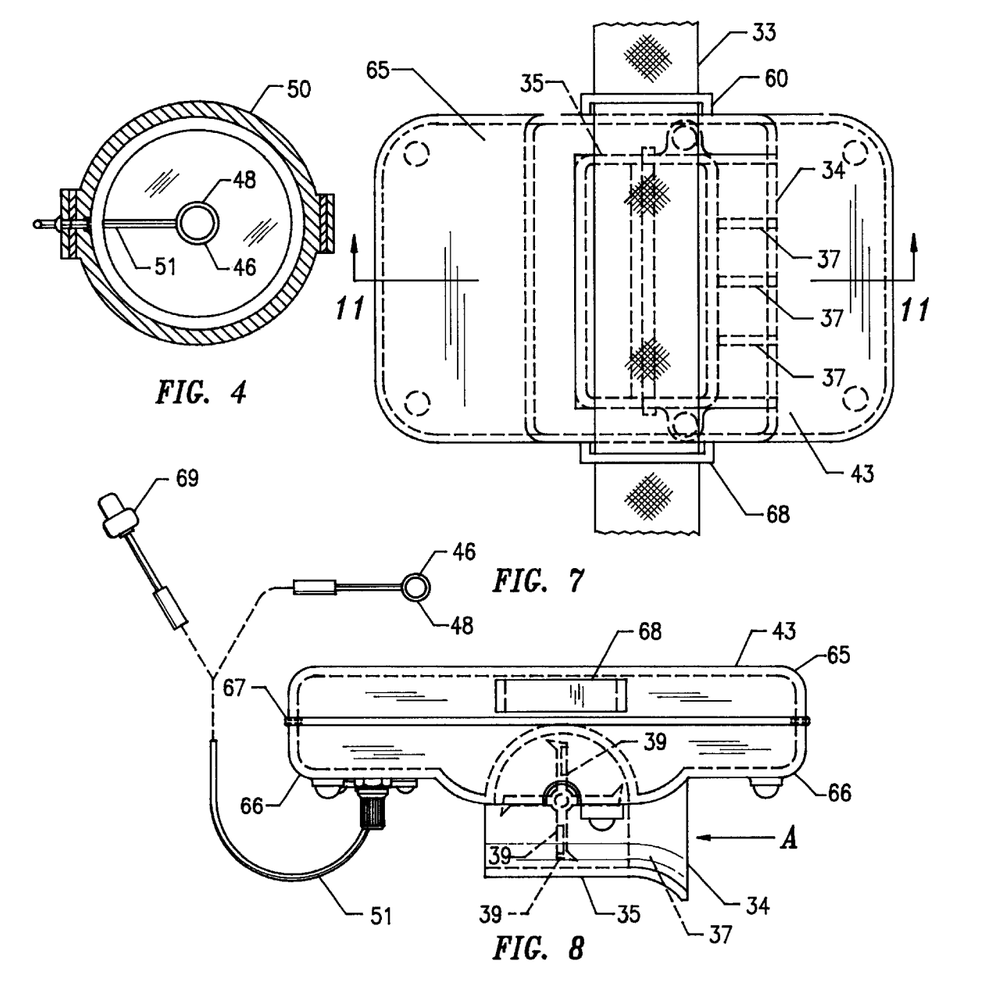
FIG. 4 is a cross-sectional view taken on the line 4—4 in FIG. 3.
FIG. 7 is a plan view of a module worn by the swimmer.
FIG. 8 is a right side view of the module.
Figure 5:
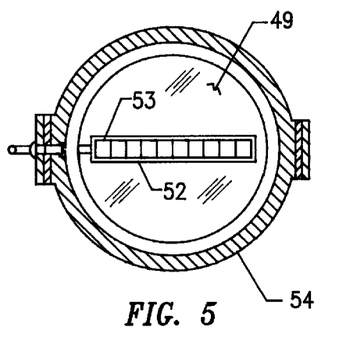
FIG. 5 is a cross-sectional view through an alternate embodiment taken in a similar manner as FIG. 4.

In the embodiment depicted in FIGS. 2–4, the visual display 46 is comprised of a flashing single light emitting diode (LED) 48 mounted on a lens 49 of a conventional pair of swimmer's goggles 50. The LED 46 is connected to the module 31 by a wire 51. It will be appreciated that the LED 48 may also be mounted on slender arms attached to such devices as a swimmer's cap.

Increases in the swimmer's speed causes the LED 48 to flash at a higher frequency, informing the swimmer 32 his speed has increased. Conversely, a decreased frequency informs the swimmer 32 his speed has decreased.

Changes in color can also be used to indicate changes in speed. An LED which changes in color with changes in voltage is manufactured by Electronics Limited, and called an MVI (see Tracton, K, *Display Devices*, Tab Books, 1977). The Electronics Limited MVI diode changes from red to orange to yellow to chartreuse to green with increasing voltage. For this type of LED, the output of the signal processing unit 45 is a voltage which varies in magnitude directly with the frequency of the output of the sensor 42.

LED's are particularly well suited for the present invention because they are sealed units, low in cost, draw only small amounts of current, are resistant to shock, and turn "on" and "off" at great speeds with short rise and fall times. Moreover, because light emission is by means of PN junctions rather than incandescence, they have exceptionally long service lives of about 100,000 hours. A further benefit is that they are available in several colors.

Figure 13:
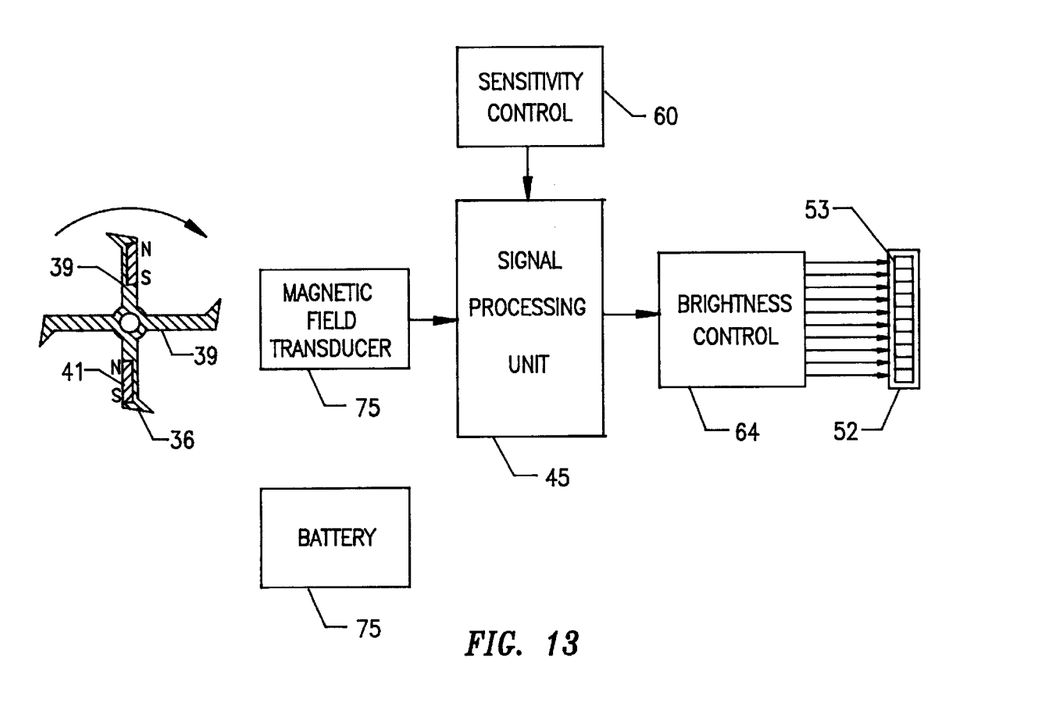
FIG. 13 is block diagram of the alternate embodiment shown in FIG. 5.

In lieu of the single LED 48, LED arrays may be used for informing the swimmer 32 of changes in his performance. In FIGS. 3 and 13 a linear LED array 52 of single color light emitting diodes 53 is shown mounted on a pair of goggles 54. The linear array 52 is a component of an embodiment which is depicted in block diagram form in FIG. 13. For this array 52, the output of the sensor 42 is processed in the signal processing unit 45 to sequentially illuminate LED's 53 at a frequency which varies directly with the swimmer's speed in a repeating pattern.

Figure 6:
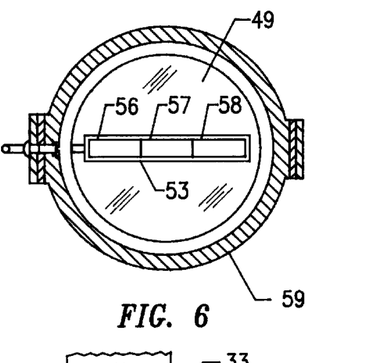
FIG. 6 is a cross-sectional view through another alternate embodiment taken in a similar manner as FIG. 4.
Figure 9:
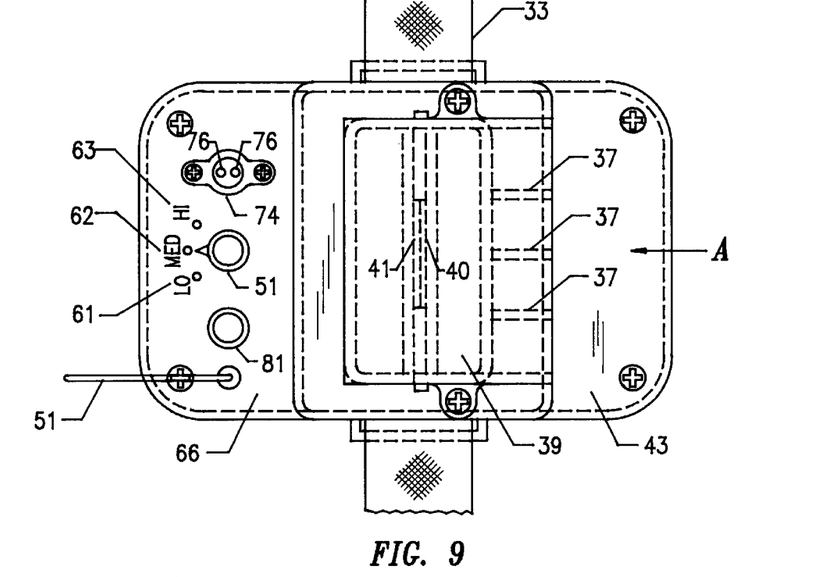
FIG. 9 is a bottom view of the module.
Figure 10:
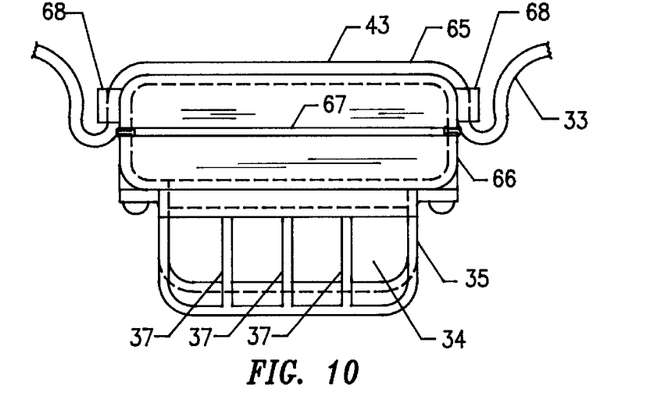
FIG. 10 is a rear view of the module.
Figure 14:
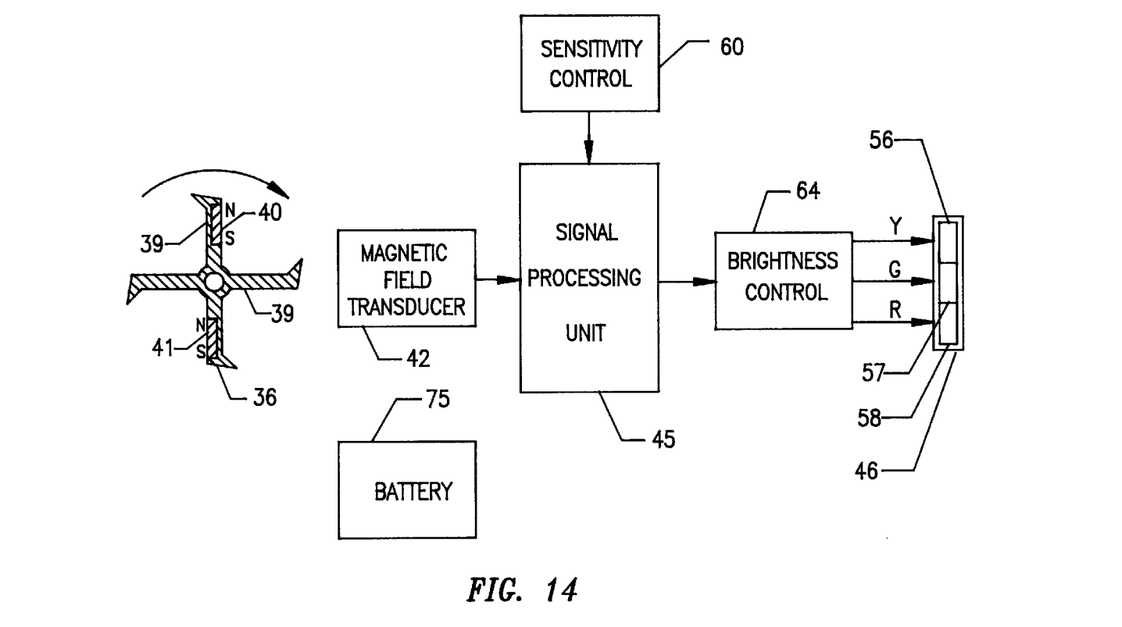
FIG. 14 is a block diagram of the alternate embodiment shown in FIG. 6.

In FIGS. 6 and 14 a linear array 55 of yellow 56, green 57 and red 58 light emitting diodes is shown mounted on a pair of goggles 59. The linear array 55 is a component of an embodiment which is depicted in block diagram form in FIG. 14. For this array 55, the output of the sensor 42 is processed in the signal processing unit 45 to sequentially illuminate the yellow 56, green 57 and red 58 LED's at a frequency which varies directly with the swimmer's speed in a repeating pattern.

A sensitivity control 60 is provided to compensate for differences between the speeds of beginning swimmers and experienced swimmers wherein the degrees of improvements will substantially vary. The control provides three levels of sensitivity, namely a low ("LO") level 61, a medium ("MED") level 62, and a high (HI") level 63. At the high level 63, which is intended to be used by experienced swimmers, small changes in a swimmer's speed will produce greater changes in the visual display 46 than at the low level 61. A brightness control 64 is also provided to adjust the brightness of the visual display 46.

Referring now to FIGS. 7 through 11, the upper housing 43 of the module 31 is comprised of a top half 65 and a bottom half 66. Between the top half 65 and the bottom half 66 is a gasket 67. At the sides of the top half 65 are integral loop shaped brackets 68 which attach the belt 33 to the module 31. The belt 33 passes through the brackets 68 and over the top half 65.

Figure 1:
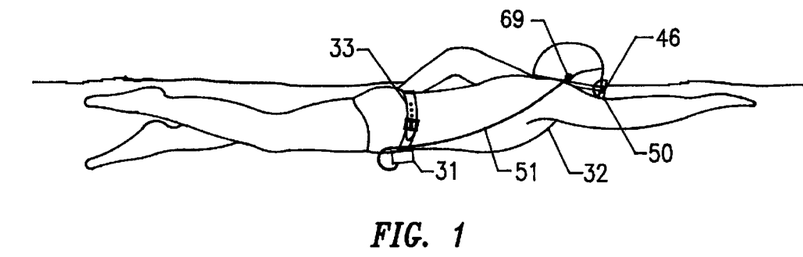
FIG. 1 is a right side view of a swimmer and training apparatus according to my invention.
Figure 15:
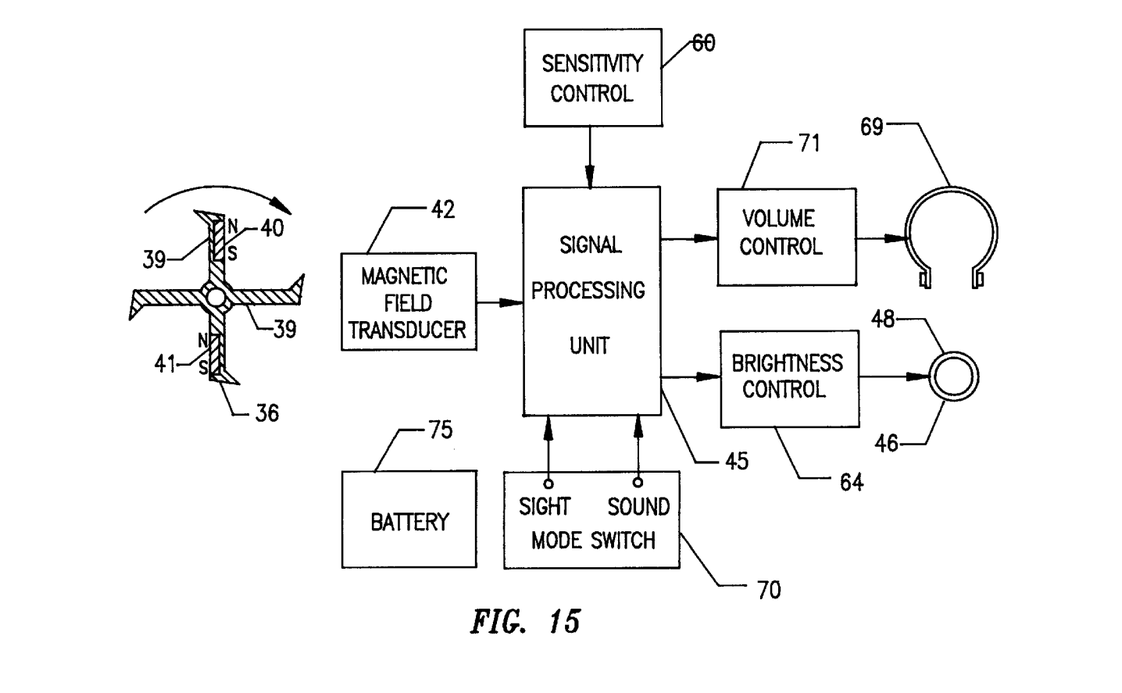
FIG. 15 is a block diagram of a swimmer's training apparatus having optional visual and audio output signals.
Figure 16:
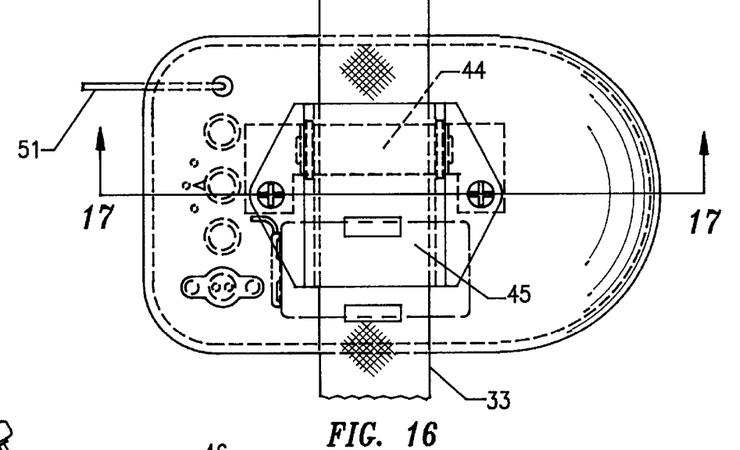
FIG. 16 is a plan view of a second aspect of the invention wherein a pulsating voltage is induced in a coil by a pair of rotating magnets.
Figure 17:
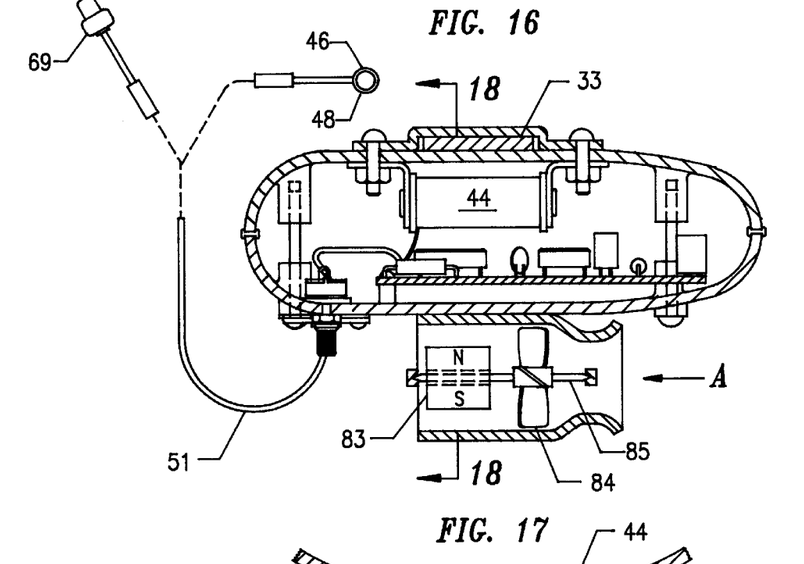
FIG. 17 is a cross-sectional view taken on the line 17—17 in FIG. 16.
Figure 18:
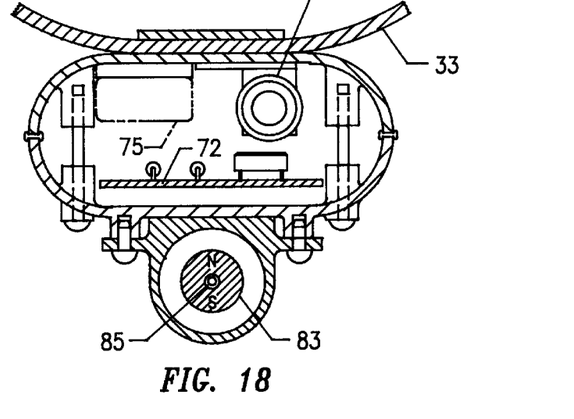
FIG. 18 is a cross-sectional view taken on the line 18—18 in FIG. 17.
Figure 19:
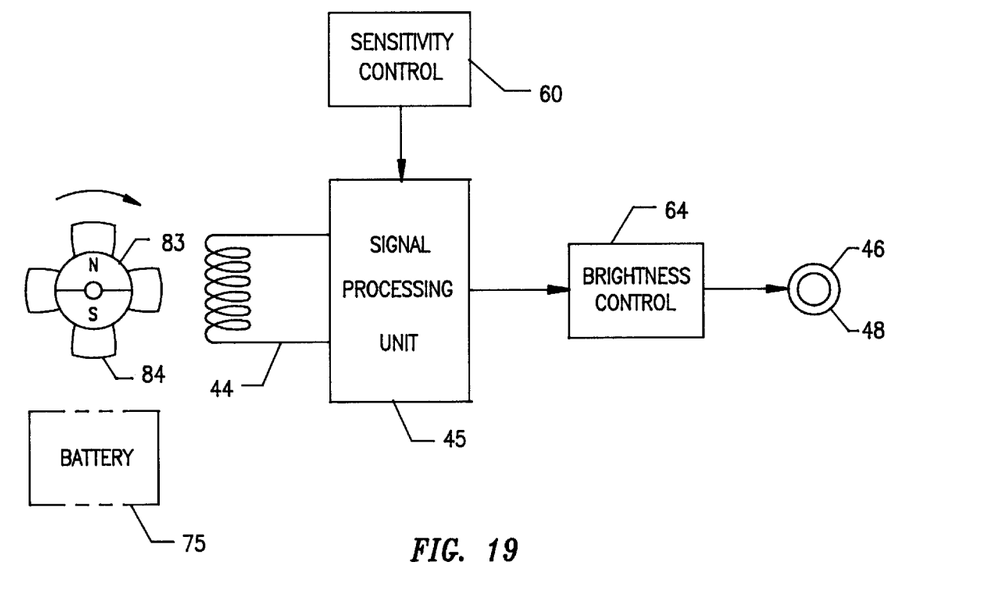
FIG. 19 is a block diagram of the second aspect of the invention.

The earphone which is shown in FIGS. 1 and 8 is part of the optional audio mode which is shown in the block diagram of FIG. 15 wherein the audio mode is optional with a visual mode. The audio mode is more fully described in the referenced pending application Ser. No. 08/629,026. The embodiment of FIG. 15 also includes a mode switch 70 and a volume control 71. A frequency multiplier and amplifier for use in the audio mode are disclosed in the referenced pending application and are incorporated in the signal processing unit 45 of FIG. 15 by reference.

Figure 11:
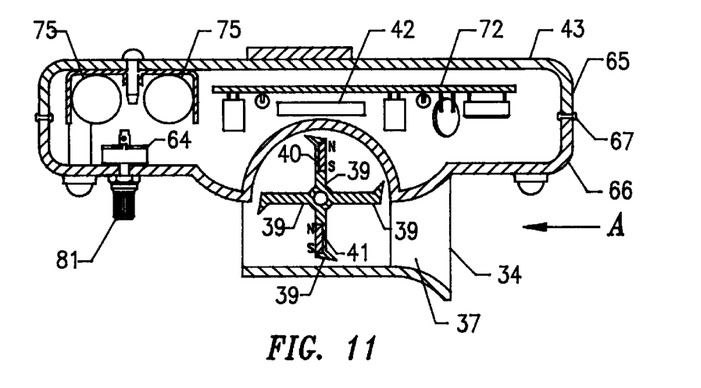
FIG. 11 is an enlarged cross-sectional view of the module taken on the line 11—11 in FIG. 7.
Figure 12:
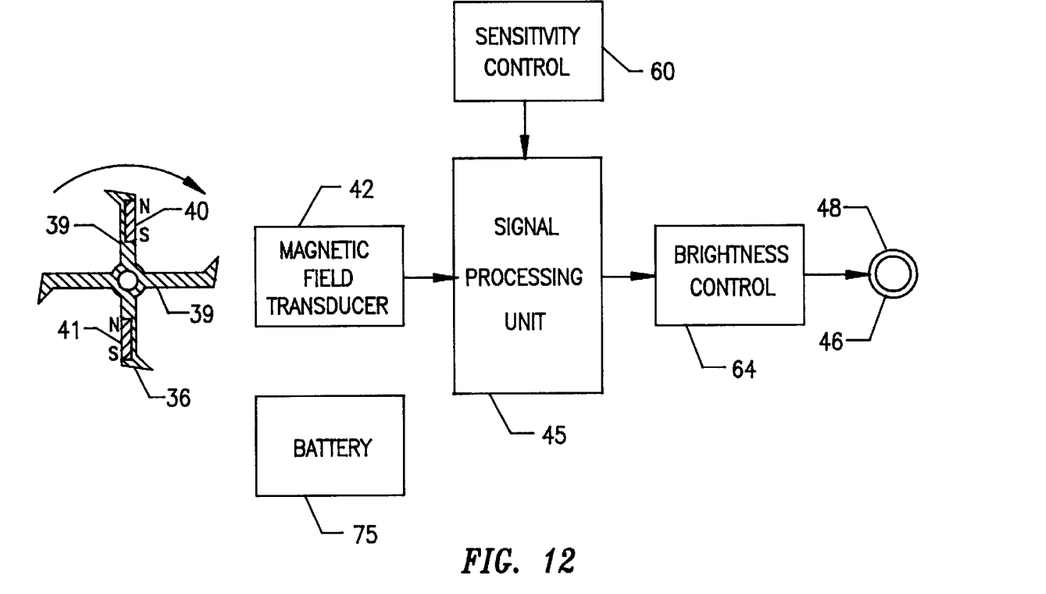
FIG. 12 is a block diagram of the training apparatus.

Referring now to FIG. 11, inside of the module 31 is a circuit board 72 which carries the components of the signal processing unit 45. Also inside the module 31 are a brightness control 64, a water actuated switch 74, and a pair of batteries 75.

Figure 20:
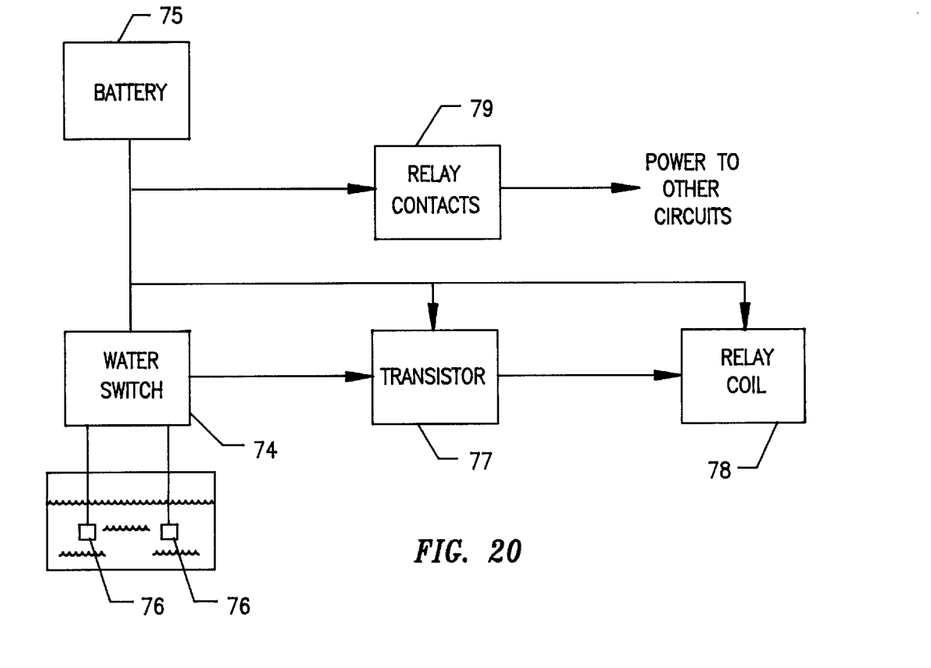
FIG. 20 is a block diagram of a water actuated switch.

The water activated water switch 74 and its associated circuitry are shown in block diagram form in FIG. 20. The switch 74 is normally open and automatically closes when the module 31 is immersed in water. When the module 31 is removed from water it opens. When the module 31 is immersed in water, two exposed contacts 76 on the module 31 are shorted together by the water to activate an "On-Off" circuit. The switch 74 is connected to the batteries 75 and a circuit which remains active when the switch 74 is removed from the water and power is interrupted to the other circuits. When the training apparatus is not in use, the active circuit draws a negligible current, commonly referred to as "quiescent current" in a microamp range. When the module 31 is immersed in water and the contacts 76 are shorted, a transistor 77 is turned on thereby energizing a relay coil 78. The relay's contacts 79 close, supplying power to the other circuits.

Adjacent the water switch 74 on the bottom half 66 of the upper housing 43 are a knob 80 for adjusting sensitivity and a knob 81 for adjusting the brightness of the visual display 46.

Referring now to FIGS. 16 through 19, an embodiment is shown wherein a pulsating voltage is generated by a coil 82 in a rotating magnetic field of a single ring magnet 83 which is driven by a propeller 84. The ring magnet 83 is mounted on a common shaft 85 with the propeller 84. The propeller 84 is driven by the motion of the swimmer 32 and revolves about an axis which is aligned with the path of the swimmer 32. The magnetic field of the rotating ring magnet 83 induces a pulsating voltage during each revolution of the magnet 83. The pulsating output of the coil 82 is processed in a signal processing unit 45 and transmitted to a visual display 46 worn by the swimmer 32.

The use of the battery for this embodiment is optional and will depend on the current requirements of the visual display. An optional battery 75 is shown in phantom.

From the foregoing, it will be appreciated that my invention provides a swimmer's training apparatus having benefits heretofore unavailable. My invention not only provides a means for optimizing a swimmer's performance, but also a means for reducing the time for optimizing his performance. Moreover, the invention is easy to operate and is substantially "service free".

Although only several embodiments have been illustrated and described, it is not my intention to limit my invention to these embodiments, since after having the benefit of this disclosure, obvious changes in material, shape, arrangement of components and substitution of components can be made by ordinary persons skilled in the art without departing from the spirit thereof.

I claim:

1. A method for instantly informing a swimmer during swimming of the effects of chances in his form and/or movement on his speed comprising the steps of: rotating at least one magnet worn by a swimmer to generate patterns of signals which are indicative of whether said changes have increased or decreased the speed of said swimmer; processing said patterns of signals to display on a visual display worn by said swimmer information which varies in a manner which is indicative of said changes in said speed of said swimmer; and instantly displaying said information on said display worn by said swimmer to instantly inform said swimmer during swimming of whether said changes have increased or decreased his speed.

2. The method recited in claim 1 wherein said display is at least one light emitting diode.

3. The method recited in claim 2 wherein said light emitting diode is mounted on a lens of a pair of goggles worn by said swimmer.

4. The method recited in claim 2 wherein said light emitting diode flashes "on" and "off" at a frequency which increases directly with an increase of speed of said swimmer.

5. The method as recited in claim 1 further comprising the step of mounting said apparatus on a mid portion of said swimmer.

6. The method as recited in claim 5 wherein said apparatus is mounted on a mid portion of said swimmer's abdomen.

7. The method as recited in claim 1 wherein said apparatus is mounted on a mid portion of said swimmer's back.

8. The method as recited in claim 1 further comprising the steps of automatically activating said apparatus by immersing said apparatus in water and automatically de-activating said apparatus by removing said apparatus from said water.

9. The method as recited in claim 1 further comprising the step of changing the color of said video display when said speed of said swimmer is changed.

10. The method as recited in claim 1 wherein said visual display is comprised of an array of light emitting diodes.

11. The method as recited in claim 10 further comprising the step of changing the colors of said light emitting diodes during changes in said swimmer's speed.

12. The training method as recited in claim 1 wherein said apparatus further comprises a means for producing a pulsating audio signal having a frequency which varies directly with said swimmer's speed.

13. A method for instantly informing a swimmer during swimming of the effects of changes in his form and/or movement on his speed comprising the steps of: mounting an apparatus on a mid-portion of a swimmer for generating patterns of signals which are indicative of whether said changes have increased or decreased said speed of said swimmer; swimming with said apparatus to rotate said apparatus; changing said swimmer's form or movement to vary said signals: processing said signals to display on a visual display worn by said swimmer information which vary in a manner which is indicative of changes in the speed of said swimmer; and displaying said information on said display worn by said swimmer.

14. The method as recited in claim 13 further comprising the step of selectively adjusting the sensitivity of said apparatus to enable said swimmer to determine the effect of small changes in said swimmer's speed.

15. A method for instantly informing a swimmer during swimming of the effects of changes in his form and/or movement on his speed comprising the steps of: mounting a portable apparatus on a mid-portion of a swimmer for generating signals which are indicative of changes in said speed of said swimmer; swimming with said apparatus to rotate said apparatus to generate said signals; changing said swimmer's form or movement to generate said signals; processing said signals to generate signals which vary directly in frequency with said speed of said swimmer; and instantly communicating said fluctuating visual signals to said swimmer to immediately inform him whether his speed has increased or decreased.

* * * * *